(12) United States Patent
Zheng et al.

(10) Patent No.: US 10,679,054 B2
(45) Date of Patent: Jun. 9, 2020

(54) OBJECT COGNITIVE IDENTIFICATION SOLUTION

(71) Applicant: International Business Machines Corporation, Armonk, NY (US)

(72) Inventors: Jiayu Zheng, Shenzhen (CN); Lingle Guo, Shenzhen (CN); LiCen Mu, Shenzhen (CN); Susan Zhai, Shenzhen (CN); Xiao Hu, Shenzhen (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 16/120,737

(22) Filed: Sep. 4, 2018

(65) Prior Publication Data
US 2020/0074175 A1    Mar. 5, 2020

(51) Int. Cl.
| | |
|---|---|
| *G06K 9/00* | (2006.01) |
| *G06T 7/62* | (2017.01) |
| *G01B 11/00* | (2006.01) |
| *G06T 7/246* | (2017.01) |
| *G01J 5/00* | (2006.01) |
| *G06K 9/62* | (2006.01) |

(52) U.S. Cl.
CPC ........ *G06K 9/00624* (2013.01); *G01B 11/002* (2013.01); *G01J 5/0022* (2013.01); *G06K 9/6289* (2013.01); *G06T 7/246* (2017.01); *G06T 7/62* (2017.01)

(58) Field of Classification Search
CPC ........ G06F 16/5854; G06F 16/50; G06K 9/78
USPC ........ 382/103, 154, 202, 141, 181; 348/584, 348/591; 345/156, 632
See application file for complete search history.

(56) References Cited

U.S. PATENT DOCUMENTS

| | | |
|---|---|---|
| 6,900,731 B2 | 5/2005 | Kreiner et al. |
| 7,274,295 B2 | 9/2007 | Koch et al. |
| 7,420,465 B2 | 9/2008 | Ritter |
| 7,539,563 B2 | 5/2009 | Yang et al. |
| 8,212,668 B2 | 7/2012 | Gabara |
| 8,602,857 B2 | 12/2013 | Morichau-Beauchant et al. |
| 8,868,533 B2 | 10/2014 | Powell et al. |
| 8,942,468 B1 | 1/2015 | Toshev et al. |
| 9,152,862 B2 | 10/2015 | Ross et al. |
| 9,342,532 B2 | 5/2016 | Piratla et al. |

(Continued)

FOREIGN PATENT DOCUMENTS

WO    2011/107878 A1    9/2011

*Primary Examiner* — Kiet M Doan
(74) *Attorney, Agent, or Firm* — Cantor Colburn LLP; Tihon Poltavets

(57) ABSTRACT

Embodiments of the present invention provide a computer-implemented method for identifying a specified object. The method includes collecting attributes of a physical object within a physical space, in which the attributes include an object temperature obtained via an (IR) sensor and an object shape obtained via an image sensor. A machine learning algorithm is executed to allocate a coordinate to the object based on the attributes. In response to a request from a user to locate the object, the physical space is scanned via the IR sensor and the image sensor to identify the object and to detect a present location. An indication of a location of the object is then displayed to the user, in which the indication is at least one of the present location of the object or a predicted location of the object.

17 Claims, 5 Drawing Sheets

(56) References Cited

U.S. PATENT DOCUMENTS

| | | | |
|---|---|---|---|
| 9,372,903 | B1 | 6/2016 | Richt et al. |
| 9,443,414 | B2 | 9/2016 | Scavezze et al. |
| 9,519,836 | B2 | 12/2016 | Briggs et al. |
| 9,842,283 | B2 | 12/2017 | Chang et al. |
| 2002/0156756 | A1 | 10/2002 | Stanley et al. |
| 2006/0095170 | A1 | 5/2006 | Yang et al. |
| 2007/0027927 | A1 | 2/2007 | Theis |
| 2010/0056285 | A1* | 3/2010 | Weston .................. A63G 31/00 472/136 |
| 2011/0222729 | A1 | 9/2011 | Gabara |
| 2014/0044305 | A1 | 2/2014 | Scavezze et al. |
| 2014/0140570 | A1 | 5/2014 | Ross et al. |
| 2015/0063711 | A1 | 3/2015 | Briggs et al. |
| 2015/0262116 | A1 | 9/2015 | Katircioglu et al. |
| 2016/0142345 | A1 | 5/2016 | Younani |
| 2016/0150213 | A1* | 5/2016 | Mutti ..................... G06K 9/228 348/143 |
| 2017/0243317 | A1 | 8/2017 | Rodriguez et al. |
| 2017/0316284 | A1 | 11/2017 | Chang et al. |

\* cited by examiner

OBJECT COGNITIVE IDENTIFICATION SOLUTION

BACKGROUND

The present invention generally relates to object recognition technology, and more specifically, to a cognitive-based object identification solution that can locate a target object according to its attributes, without a specific need to add identifying markings on the surface of the object.

People tend to forget or are unable to remember where physical objects are located. This issue has been exacerbated over the last few years because the number of items found in the home has increased. As such, equipment used to find items within the home needs to improve in order to locate objects in a manner that is both timely and accurate. Some systems perform object recognition based on placing a marking on an object such as a tag or label and then utilizing marking detection technology such as RFID technology to detect the object within a certain physical space. Some systems search and locate desired objects by preloading a reference image of the desired object and then capturing a real-time captured image of the object to the preloaded reference image.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown.

SUMMARY

Embodiments of the present invention provide a computer-implemented method for identifying a specified physical object based on a plurality of attributes that are obtained via at least a plurality of sensors. A non-limiting example of the computer-implemented method includes collecting the plurality of attributes of the specified physical object that is within a physical space, in which the plurality of attributes includes a temperature of the specified physical object, and a shape of the specified physical object. The temperature of the specified physical object is obtained via one or more infrared (IR) sensors. The shape is obtained via one or more image sensors. The method includes executing a machine learning algorithm to allocate a coordinate to the specified physical object based on the plurality of attributes, in which the coordinate represents a location of the specified physical object within the physical space at the time of the collection of the plurality of attributes. The method includes monitoring, a status of the specified physical object within the physical space over a period of time via at least the one or more IR sensors and the one or more image sensors, in which the monitoring of the status includes collecting coordinates of the specified physical object within the physical space to obtain locations of the specified physical object within the physical space over the period of time. The method includes in response to receiving a request from a user to locate the specified physical object, scanning the physical space via the at least one or more IR sensors and the one or more image sensors to identify the specified physical object within the physical space and to detect a present location of the specified physical object within the physical space. The method includes displaying to the user, an indication of a location of the specified physical object, in which the indication is at least one of the present location of the specified physical object or a predicted location of the specified physical object.

Embodiments of the present invention provide a system for identifying a specified physical object based on a plurality of attributes that are obtained via at least a plurality of sensors. The system includes one or more processors that are configured to perform a method. A non-limiting example of the method includes collecting the plurality of attributes of the specified physical object that is within a physical space, in which the plurality of attributes includes a temperature of the specified physical object, and a shape of the specified physical object. The temperature of the specified physical object is obtained via one or more infrared (IR) sensors. The shape is obtained via one or more image sensors. The method includes executing a machine learning algorithm to allocate a coordinate to the specified physical object based on the plurality of attributes, in which the coordinate represents a location of the specified physical object within the physical space at the time of the collection of the plurality of attributes. The method includes monitoring, a status of the specified physical object within the physical space over a period of time via at least the one or more IR sensors and the one or more image sensors, in which the monitoring of the status includes collecting coordinates of the specified physical object within the physical space to obtain locations of the specified physical object within the physical space over the period of time. The method includes in response to receiving a request from a user to locate the specified physical object, scanning the physical space via the at least one or more IR sensors and the one or more image sensors to identify the specified physical object within the physical space and to detect a present location of the specified physical object within the physical space. The method includes displaying to the user, an indication of a location of the specified physical object, in which the indication is at least one of the present location of the specified physical object or a predicted location of the specified physical object.

Embodiments of the invention provide a computer program product for identifying a specified physical object based on a plurality of attributes that are obtained via at least a plurality of sensors, the computer program product comprising a computer readable storage medium having program instructions embodied therewith. The program instructions are executable by a system comprising one or more processors to cause the system to perform a method. A non-limiting example of the method includes collecting the plurality of attributes of the specified physical object that is within a physical space, in which the plurality of attributes includes a temperature of the specified physical object, and a shape of the specified physical object. The temperature of the specified physical object is obtained via one or more infrared (IR) sensors. The shape is obtained via one or more image sensors. The method includes executing a machine learning algorithm to allocate a coordinate to the specified physical object based on the plurality of attributes, in which the coordinate represents a location of the specified physical object within the physical space at the time of the collection of the plurality of attributes. The method includes monitoring, a status of the specified physical object within the physical space over a period of time via at least the one or more IR sensors and the one or more image sensors, in which the monitoring of the status includes collecting coordinates of the specified physical object within the physical space to obtain locations of the specified physical object within the physical space over the period of time. The method includes in response to receiving a request from a user to locate the specified physical object, scanning the physical space via the at least one or more IR sensors and the one or more image sensors to identify the specified physical object within the physical space and to detect a present location of the specified physical object within the physical space. The method includes displaying to the user, an indication of a location of the specified physical object, in which the indication is at least one of the present location of the specified physical object or a predicted location of the specified physical object.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
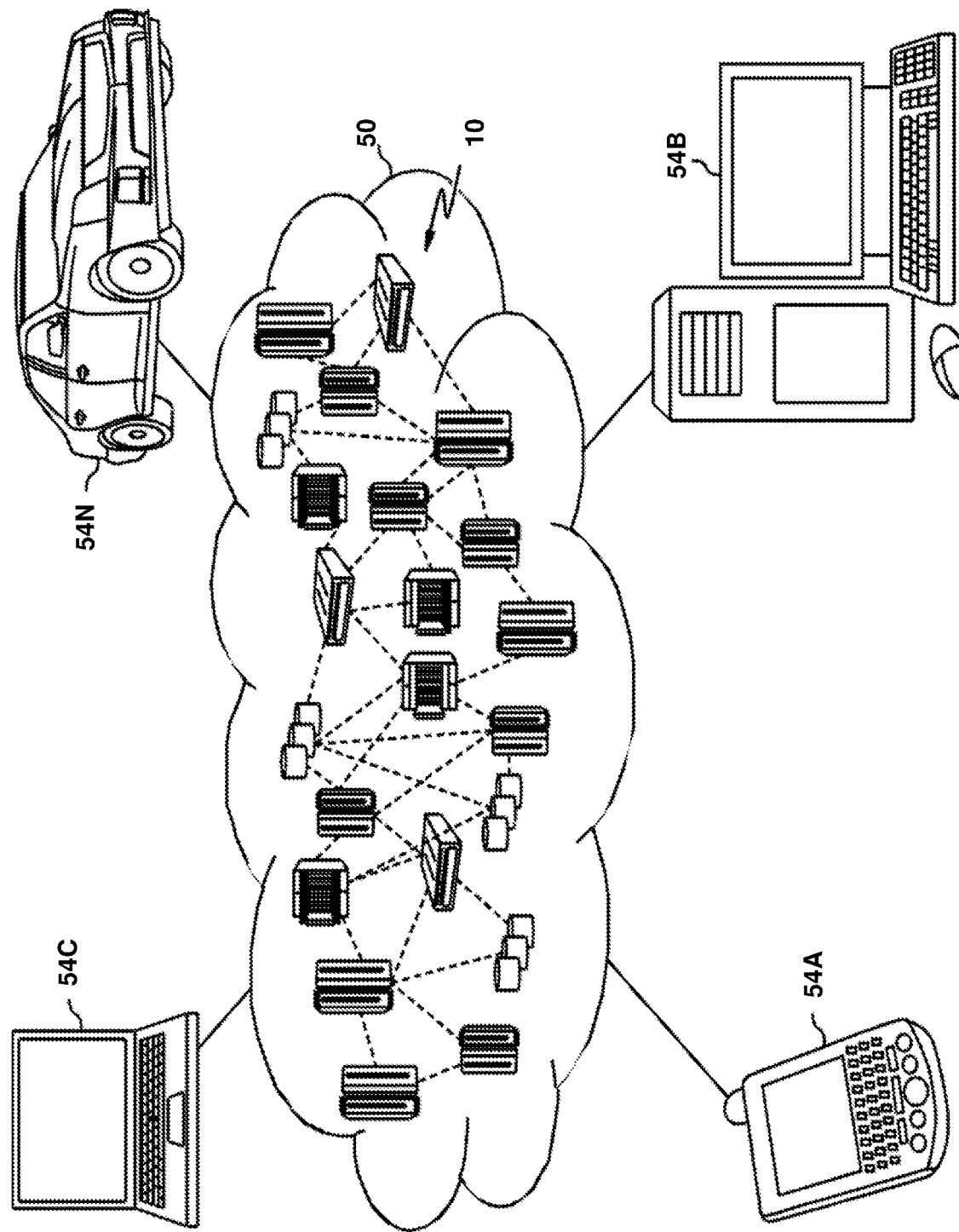
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
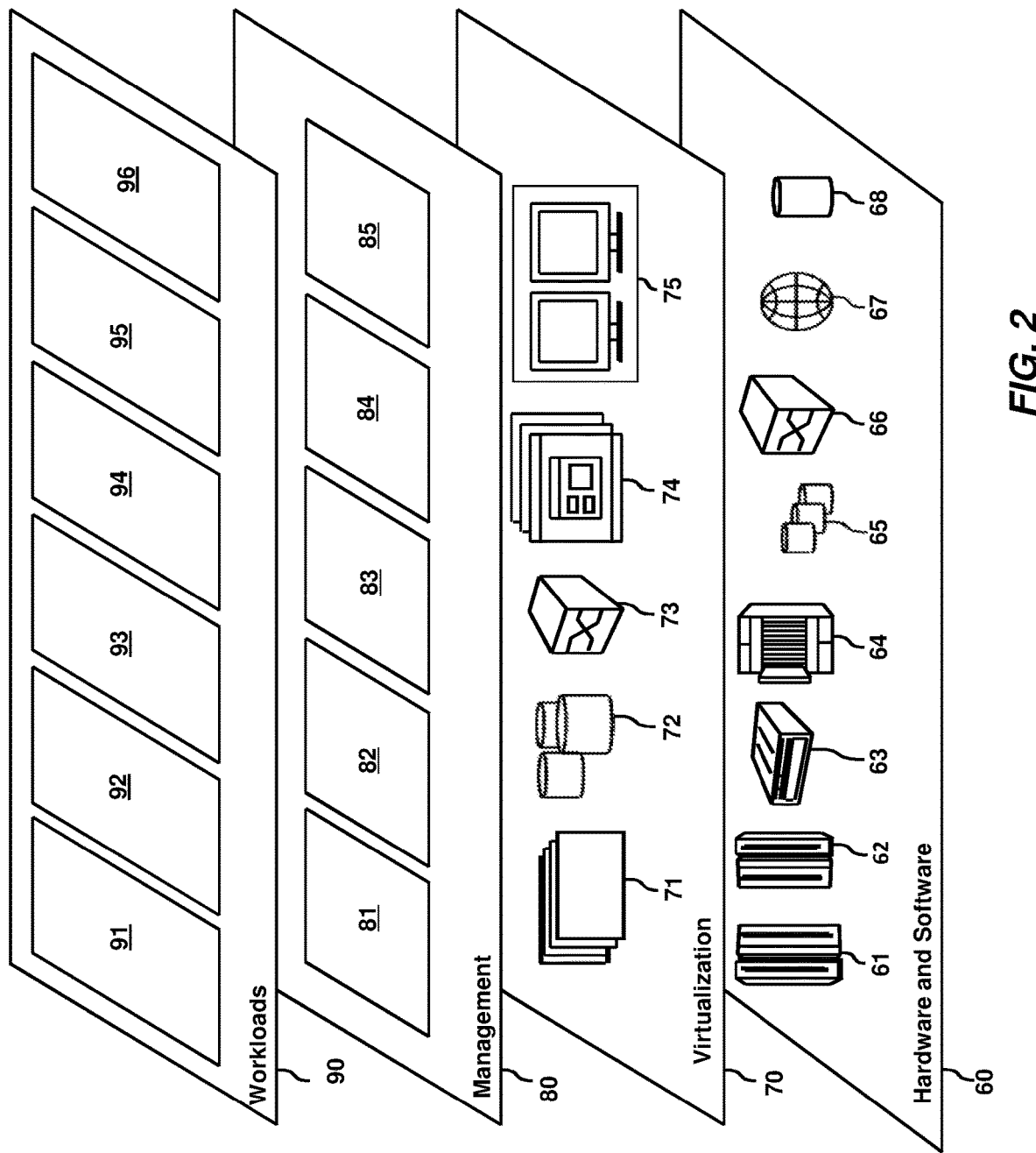
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object recognition processing 96.

Turning now to an overview of technologies that are more specifically relevant to aspects of the invention, as noted above, people tend to forget or are unable to remember where physical objects are located. This issue has been exacerbated over the last few years because the number of items found in the home has increased. As such, equipment used to find items within the home needs to improve in order to locate objects in a manner that is both timely and accurate. Some systems perform object recognition based on placing a marking on an object such as a tag or label and then utilizing marking detection technology such as RFID technology to detect the object within a certain physical space. Some systems search and locate desired objects by preloading a reference image of the desired object and then capturing a real-time captured image of the object to the preloaded reference image.

There are several difficulties involved in how traditional object identification systems operate. For example, some systems rely on preloading a reference image before any object recognition process is performed. Moreover, systems that rely on performing image analysis through the comparison of a preloaded image of a first object and a real-time captured image of a second object are often unable to recognize that the two objects are the same object when the images each have a different brightness, different viewpoints, different scales, different deformations of the object, different occlusions, and/or different amounts of background noise.

Turning now to an overview of the aspects of the invention, one or more embodiments of the invention address the above-described shortcomings of the prior art by providing a machine learning tool that is capable of identifying a specified object within a physical space such as a room via at least a plurality of detectors and/or sensors that are positioned on or within the physical space (e.g., sensors attached to walls of a given space). In some embodiments of the present invention, any item that is detected by the sensors is recorded and identified by the tool based on the item's detected appearance, material, temperature, and/or other main characteristics of the object, and then the data is transferred to a database. This data is analyzed by a trained and/or self-learning machine learning algorithm such that the tool is able to accurately identify a location of the object within the physical space and alert the user based on certain conditions.

Different from prior approaches, in some embodiments of the present invention, the system does not need to make any marks or labels on objects. Rather, a plurality of sensors are located within a physical area, in which items found in the physical area can be detected and then shown in a display device for convenient identification.

In some embodiments of the present invention, a trained machine learning model learns the object's properties by searching an online source such as a website using special characteristics and parameters of the object and obtaining object properties from the online source in view of the search. The plurality of sensors can detect diverse characteristics of objects and be used to monitor a moving track of the object. These features assist the system in identifying the object with the precise position. The system can also analyze the user's particular application scenarios to help recognize and locate the object. In some embodiments of the present invention, a similarity comparison score is shown in a display screen for one or more choices of a sequence, such as from a high percentage score to a low percentage score (e.g., probability score). In some embodiments of the present invention, feedback is obtained from the user to help the system learn and improve the accuracy of the analysis and results.

Figure 3:
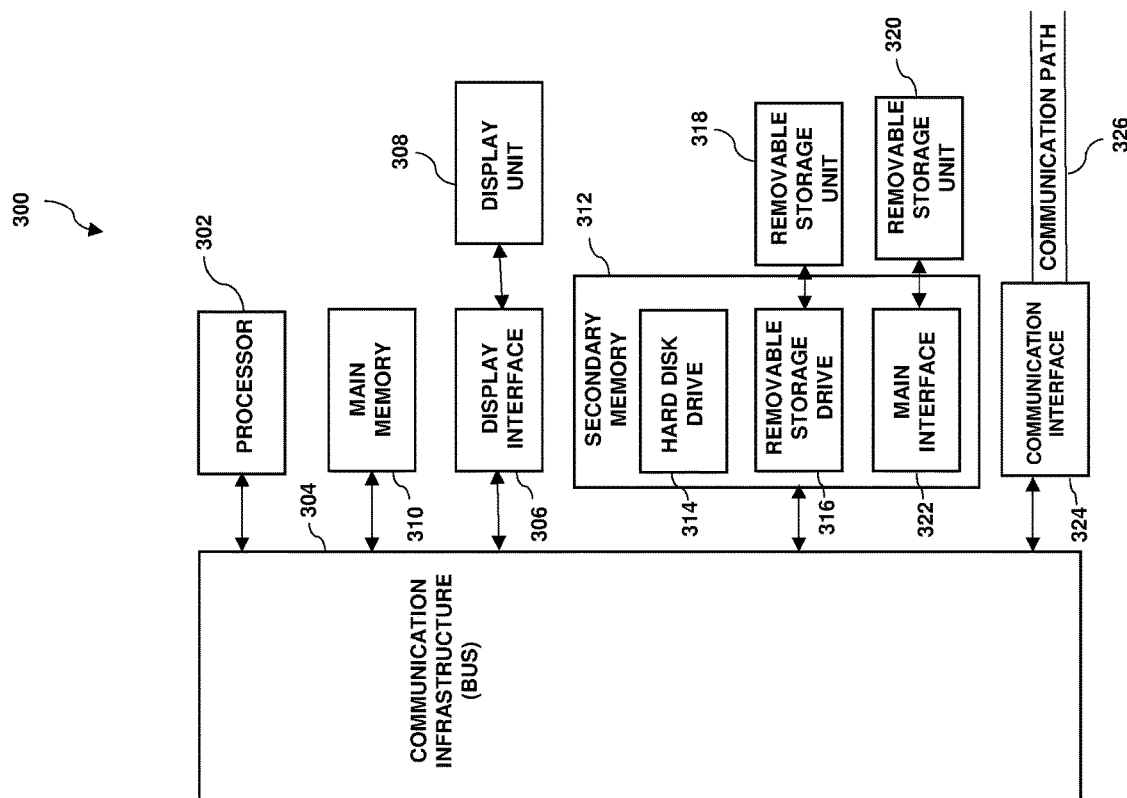
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
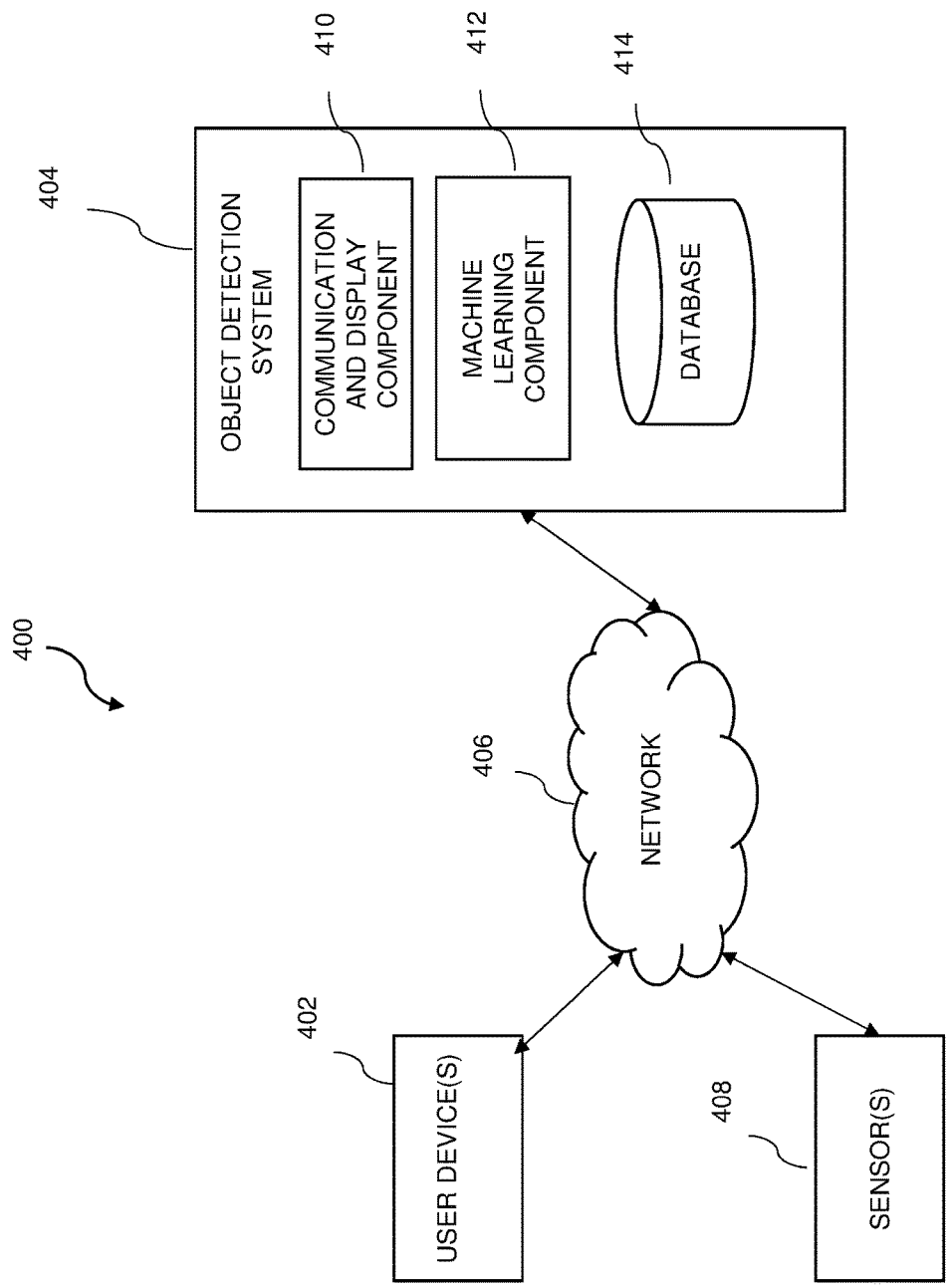
FIG. 4 depicts an example distributed environment in accordance with one or more embodiments of the present invention.

Referring now to FIG. 4, an example distributed environment 400 is presented for locating specified objects based on the object's attributes using a series of detectors and/or sensors. Distributed environment 400 includes one or more user devices 402, an object detection system 404, and a plurality of sensor 408, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. For example, in some embodiments of the present invention, the object detection system includes the plurality of sensors 408.

Object detection system 404 includes a communication and display component 410, a machine learning component 412, and a database 414. In some embodiments of the present invention, communication and display component 410, machine learning component 412, and/or database 414 are interconnected via a communication infrastructure 304 and/or communication path 326. Object detection system 404 may have internal and external hardware components, such as those depicted and described above with respect to FIG. 3.

Object detection system 404 is a machine learning system that can be utilized to solve a variety of technical issues (e.g., learning previously unknown functional relationships) in connection with technologies such as, but not limited to, machine learning technologies, video processing technologies, object generalization technologies, data analytics technologies, data classification technologies, data clustering technologies, recommendation system technologies, signal processing technologies, and/or other digital technologies. Object detection system 404 employs hardware and/or software to solve problems that are highly technical in nature, that are not abstract and that cannot be performed as a set of mental acts by a human.

Various suitable machine learning algorithms may be used to extract object properties, identify objects, identify commonalities between object clusters or categories, or generate similarity scores. In one example, a Watson API service may be used to implement and/or call a machine learning algorithm that analyzes the object properties and/or feedback. The following are non-limiting examples of cognitive APIs that may be used: Alchemy Language Icon Alchemy Language, Conversation Service Icon Conversation, Dialog Icon Dialog (Deprecated), Document Conversion Icon Document Conversion, Language Translator Icon Language Translator, Natural Language Classifier Icon Natural Language Classifier, Natural Language Understanding Icon Natural Language Understanding, Personality Insights Icon Personality Insights, Retrieve and Rank Icon Retrieve and Rank, Tone Analyzer Icon Tone Analyzer, Visual Recognition Icon Visual Recognition, Discovery Icon Discovery, and Tradeoff Analytics Icon Tradeoff Analytics.

Machine learning is often employed by numerous technologies to determine inferences and/or relationships among digital data such as sensor data. For example, machine learning technologies, signal processing technologies, image processing technologies, data analysis technologies, and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In certain embodiments of the invention, some or all of the processes performed by object detection system 404 are performed by one or more specialized computers for carrying out defined tasks related to machine learning. In some embodiments of the invention, object detection system 404 and/or components of the system are employed to solve new problems that arise through advancements in technologies mentioned above.

In general, object detection system 404 is a cognitive-based tool that, in some embodiments of the present invention, is configured to locate one or more specified objects within a physical area based on object attributes using a plurality of detectors and/or sensors 408 without a specific need to add labels, barcodes, or tags on the objects.

For example, in some embodiments of the present invention, the system utilizes integrated sensors 408 to automatically capture an object's multiple properties that include more than just image based properties (e.g., via communication and display component 410), and to locate the object according to its attributes without adding labels, barcodes, fingerprints, or tags to the objects. In some embodiments of the present invention, there is no need for the system to preload specific data of a target object or scan through a whole object at the beginning of the process to obtain a reference image. Rather, in some embodiments of the present invention, the system is able to access the internet to search for data relating to the object (e.g., characteristics, parameters, image(s), and description of the object), which assists the system in being able to recognize and locate object via machine learning (e.g., via machine learning component 412). For example, in some embodiments of the present invention, a user can provide the system with a request that includes the name of an object, and the system can search online for data that defines this object.

In some embodiments of the present invention, object detection system 404 is configured to monitor and record in real time an object's status, location, and/or historical movement track for one or more different objects found within a physical space (e.g. via sensors 408 and communication and display component 410). In some embodiments of the present invention, the physical space is an indoor environment such as a home, shopping mall, warehouse, office space, etc. In some embodiments of the present invention, the physical space is an outdoor environment such as a street or park. Object detection system 404 then maps the historical movement track and provides an answer to the user as to where the object is located in the physical space or provides a suggested location even when object detection system 404 is unable to detect the actual location of the object (e.g., via communication and display component 410). In some embodiments of the present invention, object detection system 404 records and learns different object usage environments according to a particular user's habits (e.g., via machine learning component 412), which helps object detection system 404 recognize the object and increase the accuracy of judgements made by object detection system 404 (e.g., recognition of the object, detection of the actual location of the object, predicting a location of the object, monitoring the status of the object, etc.).

In some embodiments of the present invention, object detection system 404 is configured to distinguish between two or more similar items to identify which of the two or more items is, in fact, the user's desired target item. In some embodiments of the present invention, the system distinguishes between the two or more similar items based on one or more factors such as, for example, the target item's attributes and real-time track, the target item's usage environment, the user's usage habit of the item, and/or attributes of the item obtained through the internet (e.g., the item's description, characteristics, parameters, etc.).

In some embodiments of the present invention, object detection system 404 allows for sustainable self-trained machine learning which improves the accuracy rate of finding and/or judging the required items as object detection system 404 becomes more familiar with the user's object usage environment, and user's habits, and/or the user's feedback (e.g., via machine learning component 412).

In some embodiments of the present invention, object detection system 404 includes an alert function that is configured to notify the user upon detecting the object is located in a risky area of the physical space (e.g., the item is almost falling off a table) and/or to report the object status to the user. One example benefit that stems from the use of the plurality of sensors is that object detection system 404 is able collect a plurality of attributes of the object (e.g., 3D dimension, color, temperature, etc.), calculate the barycenter of the object, and then decide whether the object is likely to fall off a present surface (i.e., risky area) based on the calculated barycenter, and/or estimate whether the object is presently in an abnormal status condition (e.g., the item is presently overheated).

In some embodiments of the present invention, object detection system 404 is a standalone computing device, a management server, a web server, a mobile computing device, or other suitable electronic device and/or computing system capable of receiving, sending, and processing data. In some embodiments of the present invention, object detection system 404 is a server computing system utilizing multiple computers, such as in cloud computing environment 50. In some embodiments of the present invention, object detection system 404 is a laptop computer, a tablet computer, a netbook computer, a personal computer (PC), a desktop computer, a personal digital assistant (PDA), a smartphone, or other suitable programmable electronic device capable of communicating with user device 402, sensors 408, and other computing devices (not shown) within distributed environment 400 via network 406. In some embodiments of the present invention, object detection system 404 is a computing system utilizing clustered computers and components (e.g., database server computers, application server computers, etc.) that act as a single pool of seamless resources that are accessible within distributed environment 400. Object detection system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, sensor 408, object detection system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow to send and/or receive information from user device 402 to object detection system 404 and/or sensors 408, which in turn allows a user access to communication and display component 410, machine learning component 412, and/or database 414. In some embodiments of the present invention, database 414 is configured to store data that is obtained from user device 402, sensors 408, an online source and/or object detection system 404 (e.g., attribute data, a matching list, and/or machine learning features).

In some embodiments of the present invention, user device 402 is configured to gather user input data, audible data, and/or visual data. In some embodiments of the present invention, user device 402 is configured to capture audio, images, and/or video of the user (e.g., via a microphone and/or camera of user device 402). In some embodiments of the present invention, user device 402 includes a GPS device for tracking a location of the user device 402. In some embodiments of the present invention, user device 402 executes one or more applications to present indications and alerts, such as an actual location of a detected object within a physical space or a suggested location of an object within a physical space. In some embodiments of the present invention, the indications and/or alerts are presented via a display device, a speaker, and/or other single or combinations of output devices. In some embodiments of the present invention, user device 402 allows the user to provide feedback to object detection system 404.

In some embodiments of the present invention, user device 402 is a laptop computer, a tablet computer, a netbook computer, a personal computer (PC), a desktop computer, a personal digital assistant (PDA), a smartphone, an internet-of-things (IoT) enabled device, and/or other suitable programmable electronic devices capable of communicating with various components and devices within distributed environment 400. In some embodiments of the present invention, user device 402 is a programmable electronic mobile device or a combination of programmable electronic mobile devices capable of executing machine readable program instructions and communicating with other computing devices (not shown) within distributed environment 400. In some embodiments of the present invention, user device 402 may include internal and external hardware components, such as those depicted and described above with respect to FIG. 3.

Sensors 408 are a plurality of sensors that are utilized to collect physical attributes of an object found in a physical area. In some embodiments of the present invention, sensors 408 include one or more image sensors and one or more infrared (IR) sensors (e.g., near-infrared sensor). Various suitable types of image sensors may be utilized in accordance with one or more embodiments of the present invention. For example, in some embodiments of the present invention, one or more of the image sensors are a three dimensional (3D) image sensor, a camera, a VR camera, a charge-coupled device (CCD) and/or a hyperspectral imaging device. In some embodiments of the present invention, the one or more image sensors are configured to collect attributes of objects such as shape (e.g., 2D or 3D shape), colors, dimensions, textures and/or materials of objects. In some embodiments of the present invention, the shape, colors, dimensions, textures, and/or materials of the object are obtained based, at least in part on, properties that are extracted from a 3D image of the physical space that captured by a 3D image sensor. In some embodiments of the present invention, the IR sensor are configured to collect attributes of objects such as a temperature of an object, a density of an object, and/or a luminosity of an object. Various suitable sensors 408 as known to those having ordinary skill in the art may be utilized in one or more embodiments of the present invention to obtain a plurality of attributes of the object.

In the example depicted in FIG. 4, object detection system 404 is configured to obtain a name of a desired physical object from a user and then collect a plurality of attributes of the desired physical object. In some embodiments of the present invention, the plurality of attributes are obtained via a plurality of sensors 408 that are located within a physical area. In some embodiments of the present invention, the collecting of attributes includes collecting from the physical area temperature(s) of the object, color(s) of the object, material(s) of the object, texture(s) of the object, and/or shape(s) of the object (e.g., 2D shape, 3D shape, etc.). In some embodiments of the present invention, the temperature of the object is obtained via one or more IR sensors of the plurality of sensors 408. In some embodiments of the present invention, the color and shape of the object are obtained via one or more image sensors of the plurality of sensors 408. In some embodiments of the present invention, the luminosity of the object, the density of the object, and/or dimensions of the object are obtained by the plurality of sensors 408. In some embodiments of the present invention, the plurality of attributes further includes a set of attributes of the object that are obtained from an online source such as a website. For example, in some embodiments of the present invention, object detection system 404 is configured to search a website to retrieve characteristics, parameters, and/or a description associated with the object. In some embodiments of the present invention, the search is conducted based on the name of the desired object, which is obtained from the user.

In the context of locating a phone, for example, a user may enter a name of a particular model of phone (e.g., brand name of a phone) or a generic placeholder (e.g., "Mobile Phone") and then object detection system 404 collects a plurality of attributes pertaining to the phone such as, for example, that the phone has a particular 3D shape (e.g., rectangular), has one or more particular colors (e.g., black and gold), is made of one or more particular materials (e.g., plastic and glass), and/or has a certain temperature or range of temperatures (e.g., a top portion of the phone being a first temperature whereas a bottom portion of the phone being a second different temperature). In some embodiments of the present invention, all or some of the attributes above are obtained via sampling of data using the plurality of sensors 408 (e.g., from image sensor data, IR sensor data, etc.). In some embodiments of the present invention, all or some of the attributes above are collected by searching an online source, in which a machine learning model is learned (e.g., via machine learning component 412) based on the online available information such as, for example, dimensions of a particular model of phone, a standard temperature range of a particular model of phone, and/or other suitable characteristics, parameters, or descriptions of the phone.

In some embodiments of the present invention, object detection system 404 is configured to analyze the attributes that were obtained by the sensors 408 and/or from the online source and to convert the data into machine language such that object detection system 404 can allocate a coordinate (location) to the object. For example, in some embodiments of the present invention, object detection system 404 is configured to execute a machine learning algorithm to allocate a coordinate to the object based on the plurality of attributes object (e.g., via machine learning component 412), in which the coordinate represents a location of the object within the physical space at the time of the collection of the plurality of attributes (e.g., a location of the object within the physical space as detected via the plurality of sensors).

In some embodiments of the present invention, object detection system 404 executes the machine learning algorithm by processing a machine learning model that is based on features that are extracted from collected attributes and/or feedback. In some embodiments of the present invention, object detection system 404 employs parallel computing to process portions of the collected attributes and/or feedback to recognize and identify a target object. For instance, in some embodiments of the invention, object detection system 404 performs parallel computing associated with two or more processors that process one or more portions of collected attributes and/or feedback in parallel. In one example, object detection system 404 executes a classification machine learning model using the features extracted from collected attributes and/or feedback to identify an actual location of the object, suggest a predicted location of the object, and/or generate a probability score. In some embodiments of the present invention, the collected attributes and/or feedback data are obtained from database 414, sensors 408, an online source, and/or from user device 402. In some embodiments of the present invention, the classification machine learning model maps extracted features to one or more categories. In another example, object detection system 404 executes a regression machine learning model using extracted features. In some embodiments of the present invention, a regression machine learning model is used to determine relationships among collected attributes and/or feedback. In yet another example, object detection system 404 executes a clustering machine learning model using a feature matrix that is populated based, at least in part, on the features that are extracted from collected attributes and/or feedback. In some embodiments of the present invention, the execution of the machine learning algorithm includes generating a matching list of objects based on the extracted attributes and recording the list in database 414.

In some embodiments of the present invention, object detection system 404 is configured to monitor a status of the object while the object is within the physical space, in which the monitoring of the status includes collecting coordinates of the object within the physical space to obtain locations of the object within the physical space. In some embodiments of the present invention, the monitoring is performed continuously over a predetermined period of time (e.g., hours, days, months, years,) or over an indefinite period of time, in which the monitoring is performed such that a status of the object is assessed at various instances in time. In some embodiments of the present invention, the monitoring of the status of the object is performed by collecting attributes of the object via at least one or more IR sensors and one or more image sensors. Data obtained from the monitoring is then utilized to update the machine learning algorithm and/or the attributes associated with the object in the matching list of objects stored in database 414.

In some embodiments of the present invention, the monitoring of the status of the object includes tracking the object's use environment and the object's frequent position within the environment (e.g., the frequency of position within a home). In some embodiments of the present invention, the monitoring includes generating a historical movement track of the object based on the collected coordinates. In some embodiments of the present invention, the historical movement track represents a plurality of locations of the object with associated points in time.

In some embodiments of the present invention, the monitoring of the status of the object includes detecting during the period of time when the object is located in a risky area (e.g., detecting that the object is likely to fall off of a surface). In some embodiments of the present invention, object detection system 404 is configured to detect when the object is located in a risky area by calculating a barycenter of the object based on the dimensions of the object (e.g., identifying the center of mass), measuring a distance between a predetermined location and the barycenter of the object, and then transmitting an alert to the user in response to detecting that the distance is less than a threshold distance (e.g., via communication and display component 410), in which the alert includes an indication of a location of the object. For example, if object detection system 404 is configured to avoid the risk of objects falling off a table, in some embodiments of the present invention, object detection system 404 is configured to transmit an alert when the object is detected as being positioned on a surface of the table while the barycenter of the object is positioned within a certain predetermined distance from the edge of the table (e.g., barycenter is detected as being n inches past the edge of the table, barycenter is detected as being n inches before the edge of the table).

In some embodiments of the present invention, the monitoring of the status of the object includes detecting during the period of time when the object is in an abnormal state (e.g., the object is overheated). In some embodiments of the present invention, object detection system 404 is configured to detect when the object is in an abnormal state by monitoring the temperature of the object over the period of time via the one or more IR sensors, and transmitting an alert to the user indicating a location of the object when object detection system 404 detects that the temperature of the object is above a predetermined maximum temperature and/or below a predetermined minimum temperature. For example, if object detection system 404 detects that the phone found within a physical space has a temperature that exceeds a maximum recommended operating temperate as established by the specification of the phone (e.g., obtained via an online source), then in some embodiments of the present invention an alert is triggered. This might occur for example when the phone is positioning in an unsafe location such as such as a surface of a stove in the kitchen.

In some embodiments of the present invention, object detection system 404 is configured to receive requests from users regarding a desired object. For example, in some embodiments of the present invention, object detection system 404 is configured to receive a user request to locate a particular object. Object detection system 404 is configured to recognize the object as being within the physical space and to detect a present location of the object within the physical space. In some embodiments of the present invention, object detection system 404 recognizes the requested object and identifies the location of the requested object by obtaining attributes of the requested object from the matching list stored in database 414, scanning the physical space using the plurality of sensors to collect attributes of one or more objects found within the physical space, and then utilizing the machine learning algorithm to match the attributes of the request object to the attributes collected.

In some embodiments of the present invention, the requested object is identified further based on historical movement track of the object. For example, consider a scenario where there are two or more kinds of similar appliance controllers within a home such as a TV controller and an air conditioning controller, in which attributes of both controllers are similar and thus difficult to distinguish. Object detection system 404 may distinguish the two controllers by, for example, tracking the movement of the various controllers over time and then learning via machine learning component 412 from the movement track where the two different controllers tend to show up most often. Accordingly, if for example a historical movement track of the TV controller establishes that the TV controller is most often found within the living room area and that the historical movement track of the air conditioning controller establishes that the air conditioning controller is most often found in a bedroom area, object detection system 404 would then identify which of the two controllers is the requested controller by distinguishing between the two controllers based on the two historical movement tracks. In some embodiments of the present invention, object detection system 404 is further configured to distinguish between two similar objects based on the object's usage environment and the user's using habit of the object within the usage environment as learned by the machine learning algorithm. In some embodiments of the present invention, object detection system 404 is configured to distinguish between two similar objects further based on the description, characteristics, and/or parameters of the object that are learned from an online source via machine learning.

In some embodiments of the present invention, if object detection system 404 is unable to detect the present location of the desired object within the physical space, object detection system 404 is generates a predicted location of the object to suggest a potential location of where the object may be positioned within or outside the physical space. This may occur for example when attributes associated with a particular object cannot be found presently within the physical area by the plurality of sensors (e.g., the object is hidden from view, object is located outside of the physical area). In some embodiments of the present invention, the predicted location is generated based on the historical movement track of the object. For example, in a scenario where object detection system 404 the plurality of sensors 408 are unable to detected a TV controller within a living room and if the historical movement track of the TV controller establishes that TV controller is most often located on a top surface of a sofa, object detection system 404 may suggest that the TV controller is located under the sofa.

In some embodiments of the present invention, object detection system 404 is configured to display to the user, an indication of a location of the object in response to the received request, in which the indication includes the present location of the object (if available) or the predicted location of the object. In some embodiments of the present invention, the indication is displayed to the user by superimposing the present location of the object on an image of the physical space. In some embodiments of the present invention, the indication is a graphical object that is superimposed over the present location of the object or the predicted location of the object (e.g., a graphical box, star, circle, text, etc.) or an outline of the object.

In some embodiments of the present invention, the indication displayed to the user further includes the historical movement track superimposed on the image of the physical space. For example, in some embodiments of the present invention, a line is drawn on an image of a physical space, such as a living room of a house, in which the line tracks the various captured locations of the object over time. In some embodiments of the present invention, the indication further includes a probability score associated with a likelihood that the predicted location of the object is correct. For example, in the scenario above regarding the location of a mobile phone, if object detection system 404 establishes via the historical movement track that the phone was located on a desk in a bedroom at a first point in time and then located on a sofa in the living room at a second point in time, object system 404 may establish via the machine learning that the phone has an 80% probability of being under the sofa and a 20% probability of being in the bedroom because the sofa was the last place the phone was detected.

In some embodiments of the present invention, after displaying the indication to the user, object detection system 404 receives feedback from the user regarding whether the object was in fact located at the indicated location. In some embodiments of the present invention, the machine learning algorithm and/or machine learning model is then updated based on the received feedback to improve the accuracy of results.

Figure 5:
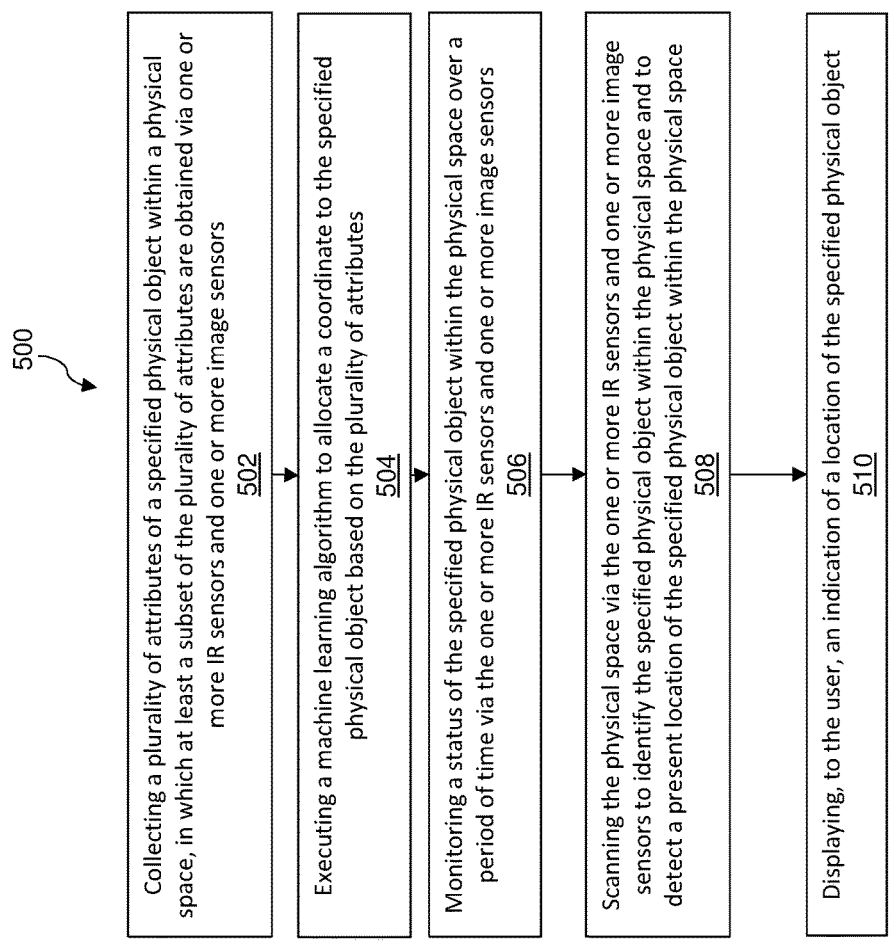
FIG. 5 depicts a diagram illustrating an example methodology of a machine learning component in accordance with one or more embodiments of the present invention.

Additional details of the operation of object detection system 404 will now be described with reference to FIG. 5, wherein FIG. 5 depicts a flow diagram illustrating a methodology 500 according to one or more embodiments of the present invention. At 502, a plurality of attributes are obtained of a specified physical object that is within a physical space. The plurality of attributes includes a temperature of the object, a color of the object, and a shape of the object, in which the temperature of the object is obtained via one or more IR sensors, in which the color and shape are obtained via one or more image sensors. At 504, a machine learning algorithm is executed to allocate a coordinate to the object based on the plurality of attributes, in which the coordinate represents a location of the object within the physical space at a time of the collection of the plurality of attributes. At 506, a status of the object within the physical space is obtained over a period of time via at least the one or more IR sensors and the one or more image sensors. The monitoring of the status includes collecting coordinates of the object within the physical space to obtain locations of the object within the physical space over the period of time. At 508, the physical space is scanned in response to receiving a request from a user to locate the object, in which the physical space is scanned via at least the one or more IR sensors and the one or more image sensors to identify the object within the physical space and to detect a present location of the object within the physical space. At 510, an indication of a location of the object is displayed, in which the indication comprises at least one of the present location of the object or a predicted location of the object.

In some embodiments of the present invention, the monitoring of the status of the object further includes generating a historical movement track of the object based on the collected coordinates. In some embodiments of the present invention, the methodology includes generating a predicted location of the object based on the historical movement track of the object in response to failing to detect the present location of the object, in which the indication that is displayed to the user is superimposed on an image of the physical space, and in which the indication includes the predicted location of the object. In some embodiments of the present invention, the indication displayed to the user further includes the historical movement track and a probability score associated with the predicted location of the object.

In some embodiments of the present invention, the plurality of attributes further includes a set of attributes of the object that are obtained from an online source, in which the generating of the predicted location of the object is further based on the set of attributes obtained from the online source.

In some embodiments of the present invention, the monitoring of the status of the object further includes calculating a barycenter of the object based on dimensions of the object, measuring a distance between a predetermined location and the barycenter of the object, and transmitting an alert to the user in response to detecting that the distance between the two is less than a threshold distance. In some embodiments of the present invention, the alert includes an indication of the location of the object.

In some embodiments of the present invention, the monitoring of the status of the object further includes monitoring the temperature of the object over the period of time, and transmitting an alert to the user indicating a location of the object in response to detecting that the temperature of the object is above a predetermined maximum temperature or below a predetermined minimum temperature. In some embodiments of the present invention, the alert includes an indication of the location of the object.

In some embodiments of the present invention, the methodology further includes receiving feedback from the user regarding whether the object was in fact at the indicated location and then updating the machine learning algorithm based on the results of the received feedback.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying a specified physical object based on a plurality of attributes that are obtained via at least a plurality of sensors, the computer-implemented method comprising:
   collecting, by a system comprising one or more processors, the plurality of attributes of the specified physical object within a physical space, wherein the plurality of attributes includes a temperature of the specified physical object and a shape of the specified physical object, wherein the temperature of the specified physical object is obtained via one or more infrared (IR) sensors, wherein the shape of the specified physical object is obtained via one or more image sensors;
   executing, by the system, a machine learning algorithm to allocate a coordinate to the specified physical object based on the plurality of attributes, wherein the coordinate represents a location of the specified physical object within the physical space at a time of the collection of the plurality of attributes;
   monitoring, by the system, a status of the specified physical object within the physical space over a period of time via at least the one or more IR sensors and the one or more image sensors, wherein the monitoring of the status includes collecting coordinates of the specified physical object within the physical space to obtain locations of the object within the physical space over the period of time;
   in response to receiving a request from a user to locate the specified physical object, scanning, by the system, the physical space via at least the one or more IR sensors and the one or more image sensors to identify the specified physical object within the physical space and to detect a present location of the specified physical object within the physical space; and
   displaying, by the system, to the user, an indication of a location of the specified physical object, wherein the indication comprises at least one of the present location of the specified physical object or a predicted location of the specified physical object;
   wherein the monitoring further includes generating a historical movement track of the specified physical object based on the collected coordinates, wherein the method further comprises:
   in response to failing to detect the present location of the specified physical object, generating the predicted location of the specified physical object based on the historical movement track of the specified physical object, wherein the indication that is displayed to the user is superimposed on an image of the physical space, wherein the indication includes the predicted location of the specified physical object.

2. The computer-implemented method of claim 1, wherein the indication displayed to the user further includes the historical movement track and a probability score associated with the predicted location of the specified physical object.

3. The computer-implemented method of claim 1, wherein the plurality of attributes further includes a set of attributes of the specified physical object obtained from an online source, wherein the generating of the predicted location of the specified physical object is further based on the set of attributes obtained from the online source.

4. The computer-implemented method of claim 1, wherein the plurality of attributes further includes dimensions of the specified physical object, wherein the monitoring of the status of the specified physical object further includes:
   calculating a barycenter of the object based on the dimensions of the specified physical object;
   measuring a distance between a predetermined location and the barycenter of the specified physical object; and
   transmitting an alert to the user in response to detecting that the distance is less than a threshold distance, wherein the alert includes an indication of a location of the specified physical object.

5. The computer-implemented method of claim 1, wherein the monitoring of the status of the specified physical object further includes:
   monitoring the temperature of the specified physical object over the period of time; and
   in response to detecting that the temperature of the specified physical object is above a predetermined maximum temperature or below a predetermined minimum temperature, transmitting an alert to the user indicating a location of the specified physical object.

6. The computer-implemented method of claim 1 further comprising:
   receiving feedback from the user regarding whether the specified physical object was at the indicated location; and
   updating the machine learning algorithm based on the received feedback.

7. A computer program product for identifying a specified physical object based on a plurality of attributes that are obtained via at least a plurality of sensors, the computer program product comprising a computer readable storage medium having program instructions embodied therewith, the program instructions executable by a system comprising one or more processors to cause the system to perform a method, the method comprising:
   collecting, by the system, the plurality of attributes of the specified physical object within a physical space, wherein the plurality of attributes includes a temperature of the specified physical object and a shape of the specified physical object, wherein the temperature of the specified physical object is obtained via one or more infrared (IR) sensors, wherein the shape of the specified physical object is obtained via one or more image sensors;
   executing, by the system, a machine learning algorithm to allocate a coordinate to the specified physical object based on the plurality of attributes, wherein the coordinate represents a location of the specified physical object within the physical space at a time of the collection of the plurality of attributes;
   monitoring, by the system, a status of the specified physical object within the physical space over a period of time via at least the one or more IR sensors and the one or more image sensors, wherein the monitoring of the status includes collecting coordinates of the specified physical object within the physical space to obtain locations of the specified physical object within the physical space over the period of time;

in response to receiving a request from a user to locate the specified physical object, scanning, by the system, the physical space via at least the one or more IR sensors and the one or more image sensors to identify the specified physical object within the physical space and to detect a present location of the specified physical object within the physical space; and displaying, by the system, to the user, an indication of a location of the specified physical object, wherein the indication comprises at least one of the present location of the specified physical object or a predicted location of the specified physical object;

wherein the monitoring further includes generating a historical movement track of the specified physical object based on the collected coordinates, wherein the method further comprises:

in response to failing to detect the present location of the specified physical object, generating the predicted location of the specified physical object based on the historical movement track of the specified physical object, wherein the indication that is displayed to the user is superimposed on an image of the physical space, wherein the indication includes the predicted location of the specified physical object.

8. The computer program product of claim 7, wherein the indication displayed to the user further includes the historical movement track and a probability score associated with the predicted location of the specified physical object.

9. The computer program product of claim 7, wherein the plurality of attributes further includes a set of attributes of the specified physical object obtained from an online source, wherein the generating of the predicted location of the specified physical object is further based on the set of attributes obtained from the online source.

10. The computer program product of claim 7, wherein the plurality of attributes further includes dimensions of the specified physical object, wherein the monitoring of the status of the specified physical object further includes:

calculating a barycenter of the object based on the dimensions of the specified physical object;

measuring a distance between a predetermined location and the barycenter of the specified physical object; and transmitting an alert to the user in response to detecting that the distance is less than a threshold distance, wherein the alert includes an indication of a location of the specified physical object.

11. The computer program product of claim 7, wherein the monitoring of the status of the specified physical object further includes:

monitoring the temperature of the specified physical object over the period of time; and in response to detecting that the temperature of the specified physical object is above a predetermined maximum temperature or below a predetermined minimum temperature, transmitting an alert to the user indicating a location of the specified physical object.

12. The computer program product of claim 7, wherein the method further comprises:

receiving feedback from the user regarding whether the object was at the indicated location; and updating the machine learning algorithm based on to the received feedback.

13. A system for identifying a specified physical object based on a plurality of attributes that are obtained via at least a plurality of sensors, the system comprising one or more processors configured to perform a method, the method comprising:

collecting, by the system, the plurality of attributes of the specified physical object within a physical space, wherein the plurality of attributes includes a temperature of the specified physical object, and shape of the specified physical object, wherein the temperature of the specified physical object is obtained via one or more infrared (IR) sensors, wherein the shape of the specified physical object is obtained via one or more image sensors;

executing, by the system, a machine learning algorithm to allocate a coordinate to the specified physical object based on the plurality of attributes, wherein the coordinate represents a location of the specified physical object within the physical space at a time of the collection of the plurality of attributes;

monitoring, by the system, a status of the specified physical object within the physical space over a period of time via at least the one or more IR sensors and the one or more image sensors, wherein the monitoring of the status includes collecting coordinates of the specified physical object within the physical space to obtain locations of the specified physical object within the physical space over the period of time;

in response to receiving a request from a user to locate the specified physical object, scanning, by the system, the physical space via at least the one or more IR sensors and the one or more image sensors to identify the specified physical object within the physical space and to detect a present location of the specified physical object within the physical space; and displaying, by the system, to the user, an indication of a location of the specified physical object, wherein the indication comprises at least one of the present location of the specified physical object or a predicted location of the specified physical object;

wherein the monitoring further includes generating a historical movement track of the specified physical object based on the collected coordinates, wherein the method further comprises:

in response to failing to detect the present location of the specified physical object, generating the predicted location of the specified physical object based on the historical movement track of the specified physical object, wherein the indication that is displayed to the user is superimposed on an image of the physical space, wherein the indication includes the predicted location of the specified physical object.

14. The system of claim 13, wherein the indication displayed to the user further includes the historical movement track and a probability score associated with the predicted location of the specified physical object.

15. The system of claim 13, wherein the plurality of attributes further includes a set of attributes of the specified physical object obtained from an online source, wherein the generating of the predicted location of the object is further based on the set of attributes obtained from the online source.

16. The system of claim 13, wherein the plurality of attributes further includes dimensions of the specified physical object, wherein the monitoring of the status of the specified physical object further includes:

calculating a barycenter of the specified physical object based on the dimensions of the object;

measuring a distance between a predetermined location and the barycenter of the specified physical object; and transmitting an alert to the user in response to detecting that the distance is less than a threshold distance, wherein the alert includes an indication of a location of the specified physical object.

17. The system of claim 13, wherein the monitoring of the status of the specified physical object further includes:

monitoring the temperature of the object over the period of time; and in response to detecting that the temperature of the specified physical object is above a predetermined maximum temperature or below a predetermined minimum temperature, transmitting an alert to the user indicating a location of the specified physical object.

\* \* \* \* \*